Figure 1:
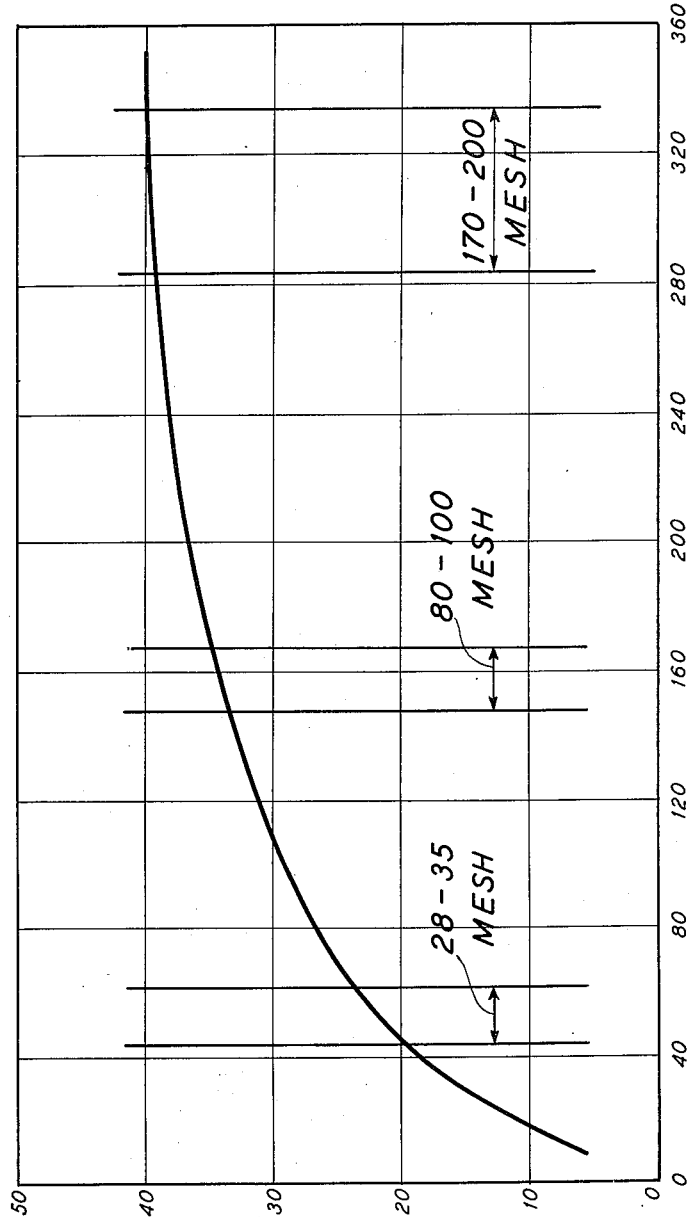

Dec. 18, 1951     M. M. HOLM ET AL     2,579,433

PROCESS FOR POLYMERIZING OLEFINS

Filed May 25, 1948

INVENTORS
Melvin M. Holm
Gordon E. Langlois

BY
ATTORNEYS

Patented Dec. 18, 1951

2,579,433

UNITED STATES PATENT OFFICE 2,579,433

PROCESS FOR POLYMERIZING OLEFINS

Melvin M. Holm, San Francisco, and Gordon E. Langlois, El Cerrito, Calif., assignors to California Research Corporation, San Francisco, Calif., a corporation of Delaware Application May 25, 1948, Serial No. 29,027

9 Claims. (Cl. 260—683.15)

The present invention relates to a process for polymerization of olefins and more particularly to an improved method for effecting the catalytic polymerization of olefins, especially normally gaseous olefins wherein the olefinic material is contacted with a catalyst comprising an active polymerizing agent disposed in a thin film on the surface of a non-porous inert solid material under polymerizing conditions.

It has long been known that inorganic acids, especially concentrated sulfuric and phosphoric acids, catalyze the polymerization of olefins. When the olefin polymerizing reaction is attempted with the liquid acids merely by bubbling the olefin as a gas through the bulk of the acid, two major difficulties are encountered: First, the rate of reaction under conditions leading to a high conversion of olefin to a desirable product is very low, and second, corrosivity of liquid acid of the proper strength under such conditions is particularly high.

U. S. Patent No. 2,186,021 discloses a method of employing inorganic acids to catalyze olefin polymerization reaction which has proven highly effective in commercial practice during the recent years. The catalyst of this patent is an inorganic acid film catalyst. The inorganic acid is disposed in a thin film on the surface of a non-reactive, non-porous, non-absorbent solid. This solid with the acid thus disposed on its surface has been found to be a particularly efficient and rugged catalyst which, in large measure, overcomes the difficulties encountered when the liquid acids are employed. As a carrier or support for thin films of acid it has been found that fragments or pellets of broken or fused non-porous quartz admirably satisfy all the requirements for a catalyst for use at any practical temperature. Various other non-porous and non-absorbent materials have been found satisfactory within the lower range of temperatures in which it is practical to catalytically polymerize olefins, that is, from about 50° F. to about 300° F., but due to the increased reactivity with the concentrated acids, especially phosphoric acid at higher temperatures, they may not be employed in the upper practical range of catalytic olefin polymerization, which is from about 300° F. to about 500° F. For use in the lower temperature range, borosilicate glass particles, high chrome or chrome-molybdenum steel chips, copper and even lead pellets may be employed without excessive attack by the acid. In the higher range, quartz or fused silica, pure silica sand, illium metal, a special chrome nickel molybdenum alloy, non-porous graphite, feldspar, horneblend, fused alundum, and certain of the high melting acid resistant synthetic resins have been found to offer more or less promise of practical utility.

In the usual commercial practice of catalytic polymerization of olefins employing the acid film type catalyst, the catalyst bed is prepared in the manner described in U. S. Patent No. 2,135,793. A bed of 10 to 20 mesh quartz particles is filled with 75 to 80% phosphoric acid. After standing, the excess acid is drained from the bed, leaving a film on the surface of the quartz particles. This film is then dried to increase the concentration of the acid on the quartz until it reaches a concentration of about 95 to 115% of orthophosphoric acid which is equivalent to about 68 to 83% $P_2O_5$ content. A feed, usually containing $C_3$ and $C_4$ olefins from cracking or reforming operations, in which the total olefinic content amounts to 45 to 50%, is passed through the catalyst mass at temperatures between about 150° F. and 375° F. The space velocity is ordinarily about .04 to .06 volume of liquid olefin per volume of catalyst per hour. The conversion attained is commonly as high as 90%. Prior to its passage through the catalyst bed, the feed is washed with caustic and with water to remove mercaptans and amines which act as catalyst poisons. Ordinarily, the feed passes successively through a small catalyst bed and then through a large catalyst bed which contains the bulk of the polymerization catalyst. The small catalyst bed is placed in the process line in order that residual catalyst poisons which may be present in the feed may be removed by action with the small bed of catalyst prior to the passage of the feed into the larger catalyst bed. In this way, regeneration of the large catalyst mass is not required as frequently as it would otherwise be. Regeneration of the larger catalyst mass is required ordinarily only once during an on-stream period of 3 to 6 months. Regeneration of the smaller catalyst mass is ordinarily required at the end of 8 or 10 days on-stream.

In each of the above-mentioned patents and in the several patents which issued from later filed applications disclosing improvements in the process, the employment of 4–20 mesh and preferably 10–20 mesh inert solid particles as support for the acid film was specifically claimed and/or taught. No wider limits were indicated nor was any suggestion made that smaller particles might be employed. The patent disclosures are candid teachings of what were believed to be the practical limits of operation in a well conceived process which has proved commercially practical over a period of approximately ten years and the commercial practice has conformed and does now conform to the patent teaching in respect to the particle size limitation of the inert solid support for the acid film.

The genesis of this teaching and practice may be appreciated from a consideration of the character of the catalyst surface, of the small size of the particles taught and employed in the process, and of the character of the product. The catalyst particles are coated with a film of phosphoric acid at a concentration in the range 95 to 115% orthophosphoric acid. As the particle size decreases, the amount of collective surface area of the particles which is in contact with other particles in the mass increases and the magnitude of individual interstitial spaces within the mass decreases. The tendency toward coalescence of the acid films and bridging of the interstitial spaces by liquid acid increases. The 10-20 mesh size particles taught by the patents and employed in practice have an average radius of only about 0.025 inch. The liquid acid film character of the catalyst and the putative tendency of such a film to bridge small interstitial spaces presumably paved the way to acceptance of 10-20 mesh size range as bounding the practically operable size limit, at least at its lower end. In the commercial operation of the process, a part of the reaction product effluent from the catalyst mass may be in liquid phase. The tendency of this liquid product to bridge small interstitial spaces also facilitated the acceptance of the 10-20 mesh particle size limitation.

It has now been found that, in a process for olefin polymerization catalyzed by an inorganic acid film disposed on the surface of non-porous, inert, solid particles, olefin conversion and overall process efficiency may be markedly increased by employing as a base for the acid film non-porous, inert, solid particles which are substantially smaller than those hitherto described and used in the art. In particular, it has been found that particles having an average diameter between those of 28-35 mesh particles and 170-200 mesh particles may be employed as a base for the acid film. The catalyst activity continues to increase as particle size is reduced; the rate of increase diminishes after the average particle size is reduced below about 35 mesh and approaches zero at 200 mesh. No appreciable operating difficulty due to bridging of the interstitial spaces between the particles either by the acid film or by such portion of the reaction product as may liquefy in the reactor under reaction conditions is encountered.

Pressure drop through the catalyst bed increases as particle size diminishes, the rate of increase being accelerated as the particle size is reduced below about 35 mesh. In the current commercial practice of the phosphoric acid film polymerization process, the pressure is in the range of about 110-300 p. s. i. g., the temperature is in the range of about 150-400° F. and the space velocity is in the range of about 0.04-0.4 v./v./hr. More recently, it has been found that this process may be conducted at higher temperatures than had hitherto been possible. The copending application of Elliott, Serial No. 15,455, shows that if the catalyst is continuously washed with a hydrocarbon liquid during the reaction, temperatures up to about 550° F. may be employed without causing excessive coking. This higher temperature operation increases conversion and makes possible higher space rates which are obtained by increasing inlet temperature. The process may now be conducted at space rates up to about 6 v./v./hr. and at pressures up to about 2000 p. s. i. g. The catalyst activity required to permit such increased space rates may be obtained by increasing temperature, decreasing catalyst particle size or both. The pressure drop incident to the employment of very small catalyst particles may readily be tolerated at high inlet pressures. In any specific operation, the feed inlet pressure substantially exceeds the pressure drop through the catalyst bed. The advantages of the increased catalyst activity which attend the employment of smaller catalyst particles are particularly well realized when normally gaseous olefins, particularly the difficultly polymerized propylene and normal butenes are being charged to the reactor.

The following table summarizes the results obtained in a series of experiments employing an acid film catalyst disposed on quartz particles of varying size. In each of the runs, the catalyst was prepared by screening out the desired size quartz particles with Tyler standard screen scale sieves. The screened quartz was aggregated in a columnar mass in a reactor and the reactor was filled with 75% phosphoric acid. The excess acid was drained from the mass, leaving a film of 75% acid on the quartz particles. This film was then dried to 100%-105% $H_3PO_4$ by passing a butane stream containing sufficient water vapor to exert a partial pressure of 25 mm. over the catalyst at 400° F. for several hours. The feed in all cases was a propylene-propane mixture containing approximately 30% propylene. The pressure in the reactor was 250 p. s. i. g. in all of the experiments and the average catalyst temperature was about 395° F. Samples of the whole reaction product were condensed and debutanized. The propylene conversion was calculated from the feed composition and the reaction product analysis.

It has been found that the rate of polymerization of propylene over phosphoric acid catalysts can be described by the following rate equation:

$$\int_0^f \frac{(1+Bf)^2\,df}{(1-f)^2+0.3f(1-f)} = \frac{KP_o}{S}$$

where $f$=fractional conversion of monomer;
$B$=fractional increase in gas volume for complete conversion of monomer;
$K$=specific reaction rate constant;
$P_o$=inlet monomer partial pressure; and
$S$=space rate in gas volumes at reaction conditions per volume of catalyst voids per hour.

The value of $K$ in each of the runs was calculated and these values corrected to 395° F. are a measure of catalyst activity.

*Table I*

| Run Nos. | 134-137 | 117-119 | 84-87 | 185 | 238 A-B | 127-130 | 204 A-B<br>228 A-B | 169 A-B | 224 A-B<br>233 A-B | 172 A-B |
|---|---|---|---|---|---|---|---|---|---|---|
| *Operating Conditions* | | | | | | | | | | |
| Quartz Size_____mesh__ | 4-6 | 10-12 | 8-14 | 10-20 | 16-20 | 16-20 | 28-35 | 28-35 | 48-60 | 80-100 |
| Av. Temp., ° F_____ | 395 | 395 | 397 | 404 | 389 | 391 | 386 | 389 | 393 | 393 |
| Pressure, p. s. i. g._____ | 250 | 250 | 250 | 250 | 250 | 250 | 250 | 250 | 250 | 250 |
| Po Atmospheres_____ | 5.47 | 5.47 | 5.47 | 5.65 | 5.56 | 5.47 | 5.57 | 5.60 | 5.57 | 5.6 |
| Av. K Corr. to 395° F___ | 3.76 | 9.72 | 9.44 | 10.2 | 15.9 | 10.95 | 22.8 | 20.4 | 27.4 | 34.7 |

The appended drawing is a graphical representation of data obtained in a series of experiments similar to those above described and summarized in Table I. The reciprocal of the diameter is proportional to surface area for spherical particles where a given mass of quartz is reduced to successively smaller spheres and this relationship should be approximately the same for irregularly shaped particles. From the drawing, therefore, it may be seen that catalyst activity increases with increasing surface area. This increase does not occur at a uniform rate and substantially all of the activity increase realizable by the reduction of particle size is obtained when a particle size about 170–200 mesh is reached. Accordingly, catalyst particles having an average diameter between those of 28–35 mesh and 170–200 mesh particles are advantageously employed in the phosphoric acid film polymerization process.

Within the above size range, however, two further limitations may be advantageously observed in the selection of the inert solid. First, the disuniformity in the sizes of the individual particles in any given catalyst bed is preferably limited in such manner that substantially all of the particles comprising the bed be within a size range encompassed by about 30 units on the Tyler standard screen scale where larger particles are employed and within a size range such that the diameter of the largest particles are not more than about three times the diameter of the smallest particles where smaller particles are employed. For example, 28–35 mesh, 24–42 mesh, or 20–48 mesh particles would be suitable for the larger particles and 60–170 mesh or 80–200 mesh would be suitable for the smaller particles. If the ranges of particle size above indicated are exceeded in an individual catalyst bed, the pressure drop through the catalyst bed commonly tends to exceed that predicted on a basis of average particle diameter by a wide margin. Such unexpectedly large pressure drop values are presumably caused by packing effects attributable to the great disuniformity of particle size. Second, it is usually preferred not to employ particles having an average diameter smaller than that of 80–120 mesh particles in commercial scale operation of the process even though activity may continue to increase as the particles become smaller and even though the process is conducted at pressures sufficiently high to make the increased pressure drop tolerable. The reason for limiting the average particle diameter to a minimum equivalent to the average diameter of 80–120 mesh particles lies entirely outside considerations of activity and pressure drop. The limit is set because of difficulties encountered in regeneration of the catalyst.

During the polymerization reaction coke and tarry materials form and accumulate on the catalyst surface making regeneration necessary. A great advantage of the process lies in the simplicity and rapidity of the regeneration. The catalyst bed is washed in situ with hot water and dried. The drying is accomplished by using water at about 280° F. for the last wash and then airblowing. The dry quartz is wet with 75% H₃PO₄ which is then dried to a concentration of 95–115% H₃PO₄ and the catalyst bed is ready for use. After long intervals or under extreme conditions it may become necessary to use either a sodium metasilicate-rosin-soap mixture in dilute aqueous solution or trisodium phosphate in dilute aqueous solution to remove the tarry material. The above methods of regeneration of the catalyst, which really effect a replacement of the acid film, are simple, quick and effective. However, if the average diameter of the catalyst particles is reduced appreciably below that of 80–120 mesh particles, regeneration in situ in this simple manner becomes very difficult.

Small particles of coke and tar loosened from the catalyst surface in the initial stages of washing tend to lodge in the small interstices between such very small solid particles and remain there during the remainder of the regeneration. When the catalyst bed is again put on stream the presence of this material causes increased pressure drop through the catalyst bed. Accumulation of coke particles in the interstices of the catalyst bed soon makes regeneration in situ impossible and the catalyst must be removed from the reactor and replaced or subjected to outside regeneration. From a process point of view, the value of the simple method of regeneration in situ usually outweighs such increase in activity as might be obtained by going to particles smaller than 80–120 mesh.

Accordingly, it is preferred to employ non-porous, solid, inert particles as a base for the acid film, which have average diameters between those of 28–35 mesh particles and 80–120 mesh particles. The particles of any particular catalyst bed are preferably limited in their disuniformity in size in such manner that the ratio of the average diameter of the larger particles of the bed to that of the smaller particles does not exceed 3 to 1. Operating conditions in the process will be within the following limits: temperature, 150–500° F.; pressure, 110–2000 p. s. i., and space velocity, 0.1–6.0 volumes of liquid feed per volume of catalyst per hour. The smaller particles within the above range are employed when higher pressures are used so that the feed inlet pressure is in substantial excess of the pressure drop through the catalyst bed.

We claim:

1. In a process for polymerizing olefinic hydrocarbons wherein an olefin-containing material is contacted with a phosphoric acid film catalyst, the improvement which comprises contacting said olefin-containing material with a catalyst consisting of non-porous, inert, solid particles having an average diameter not greater than that of 28–35 mesh particles and having a thin film of concentrated phosphoric acid disposed on the surfaces of said particles.

2. In a process for polymerizing olefinic hydrocarbons wherein an olefin-containing material is contacted with a phosphoric acid film catalyst, the improvement which comprises contacting said olefinic-containing material with a catalyst consisting of non-porous, inert, solid particles having an average diameter within the average diameter range of 28–35 mesh and 170–200 mesh particles and having a thin film of concentrated phosphoric acid disposed on the surfaces of said particles.

3. In a process for polymerizing olefinic hydrocarbons wherein said olenfinic hydrocarbons are passed through a catalyst bed comprising non-porous, inert, solid particles having a thin film of phosphoric acid disposed on their surfaces to polymerize said hydrocarbons and wherein the catalyst is periodically regenerated in situ by washing with hot water to remove coke and tarry deposits accumulated during the polymerization reaction and disposing a fresh acid film on said particle surfaces, the improvement which comprises contacting the olefinic hydrocarbons with a catalyst consisting of non-porous, inert, solid particles having an average diameter within the range of the average diameter of 28–35 mesh and 80–120 mesh particles and having a thin film of concentrated phosphoric acid disposed on the surfaces of said particles.

4. The method of polymerizing normally gaseous olefinic hydrocarbons to form normally liquid hydrocarbons which comprises passing said hydrocarbons through a catalyst bed consisting of non-porous, inert, solid particles having an average diameter within the range of the average diameters of 28–35 mesh and 170–200 mesh particles and having a thin film of 95–115% $H_3PO_4$ disposed on the surfaces of said particles, at a temperature within the range 150–500° F. and a pressure within the range 110–2000 p. s. i. g.

5. In a process for polymerizing normally gaseous olefinic hydrocarbons wherein said olefinic hydrocarbons are passed through a catalyst bed comprising quartz particles having a thin film of concentrated phosphoric acid disposed on their surfaces at a temperature of 150–500° F. and a pressure of 110–2000 p. s. i. g. to polymerize said hydrocarbons and wherein the catalyst is periodically regenerated in situ by washing with hot water to remove coke and tarry material accumulated during the polymerization reaction and disposing a fresh acid film on the particle surfaces, the improvement which comprises contacting the olefinic hydrocarbons with a catalyst consisting of 80–120 mesh quartz particles having a thin film of 95–115% $H_3PO_4$ disposed on their surfaces.

6. In a process for polymerizing olefinic hydrocarbons wherein an olefin-containing material is contacted with a phosphoric acid film catalyst, the improvement which comprises contacting said olefin-containing material with a catalyst consisting of non-porous, inert, solid particles having an average diameter within the average diameter range of 28–35 mesh and 170–200 mesh particles wherein the ratio of the average diameter of the larger particles to that of the smaller particles does not exceed 3:1 and having a thin film of concentrated phosphoric acid disposed on the surfaces of said particles.

7. The method of polymerizing olefinic hydrocarbons which comprises passing said hydrocarbons through a catalyst bed consisting of non-porous, inert, solid particles having an average diameter within the range of the average diameters of 28–35 mesh and 80–120 mesh particles, wherein the ratio of the average diameter of the larger particles of the bed to that of the smaller particles does not exceed 3:1, and having a thin film of 95–115% $H_3PO_4$ disposed on the surfaces of said particles at a temperature within the range of 150–500° F. and pressures within the range of 110–2000 p. s. i. g.

8. The process according to claim 1, with the catalyst mass comprising non-porous, inert solid particles having an average diameter substantially equivalent to that of particles having 28–35 mesh size range.

9. The process according to claim 1, with the catalyst mass comprising quartz particles of substantially 28–35 mesh size.

MELVIN M. HOLM.
GORDON E. LANGLOIS.

REFERENCES CITED

The following references are of record in the file of this patent:

UNITED STATES PATENTS

| Number | Name | Date |
|---|---|---|
| 2,186,021 | Holm et al. | Jan. 9, 1940 |
| 2,186,022 | Holm et al. | Jan. 9, 1940 |
| 2,325,136 | Kassel | July 27, 1943 |
| 2,354,261 | Hemminger | July 25, 1944 |

OTHER REFERENCES

Sabatier: Catalysis in Organic Chemistry, Van Nostrand Co., N. Y. (1923), page 10.

Schwab et al.: Catalysis, Van Nostrand Co., New York (1937), page 277.